United States Patent Office 3,642,871
Patented Feb. 15, 1972

3,642,871
ORGANIC ESTER COMPOSITIONS HAVING ENHANCED COLOR STABILITY
Clarence E. Tholstrup and Sarah J. Rush, Kingsport, Tenn., assignors to Eastman Kodak Company, Rochester, N.Y.
No Drawing. Continuation-in-part of application Ser. No. 473,234, July 19, 1965, now Patent No. 3,461,153. This application Jan. 6, 1969, Ser. No. 789,412
The portion of the term of the patent subsequent to Aug. 12, 1986, has been disclaimed
Int. Cl. C07c 69/80, 69/82
U.S. Cl. 260—475 R          9 Claims

ABSTRACT OF THE DISCLOSURE

Organic esters may be provided with enhanced color stability upon prolonged exposure to elevated temperatures by incorporating therein a combination of (A) alkali metal atoms provided by at least one alkali metal carboxylate having 2 to 18 carbon atoms or alkali metal alkoxide having 1 to 6 carbon atoms, and (B) phosphorus atoms provided by phosphorous acid. The organic esters include aliphatic esters of aliphatic and aromatic carboxylic acids and fatty glycerides.

---

This application is a continuation-in-part of Ser. No. 473,234 filed July 19, 1965 now U.S. Pat. No. 3,461,153.

This invention relates to stabilized organic esters free from acid hydrogen atoms having greatly enhanced color stability when subjected to relatively prolonged exposure to elevated temperatures as would be encountered during storage and use.

In accordance with the invention there is provided an organic ester free from acid hydrogen atoms having enhanced color stability by the incorporation therein of (A) alkali metal atoms provided by at least one alkali metal carboxylate having 2 to 18 carbon atoms or alkali metal alkoxide having 1 to 6 carbon atoms, and (B) phosphorus atoms provided by phosphorous acid.

The organic esters to which the invention relates generally include aliphatic esters of aromatic carboxylic acids, aliphatic esters of aliphatic carboxylic acids and fatty glycerides. Such esters generally have molecular weights under 1000 and are not polymeric. Some examples of these organic esters are dimethyl terephthalate, dioctyl phthalate, ethyl benzoate, glyceryl monolaurate, glyceryl tristearate, glyceryl monopalmitate, ethyl acetate, ethylene diacetate, dimethyl adipate, butyl propionate, dibutyl sebacate, octyl stearate, diisopropyl succinate, and the like. Especially preferred esters are the dialkyl terphthalates, dialkyl isophthalates and dialkyl phthalates wherein the alkyl groups have 1 to 10 carbon atoms.

The alkali metal atoms which are useful in the color stabilizer combination of this invention include potassium, sodium lithium and cesium. As previously indicated these alkali metal atoms are provided by alkali metal carboxylates having 2 to 18 carbon atoms or alkali metal alkoxides having 1 to 6 carbon atoms. The alkali metal carboxylates may include the salts derived from aliphatic or aromatic mono- or dicarboxylic acids. Some examples of these salts include potassium acetate, potassium stearate, sodium stearate, cesium propionate, lithium benzoate, potassium laurate, potassium adipate, potassium oxalate, sodium oxalate, and the like. The alkali metal alkoxides are exemplified by lithium butoxide, cesium propoxide, sodium methoxide, potassium isopropoxide, and the like.

The amounts of each stabilizer which may be used will depend on the degree of color stability desired. In general, about 0.25 to about 200 p.p.m. by weight of the alkali metal atoms and about 0.1 to about 160 p.p.m. by weight of the phosphorus atoms may be employed. It is preferred to use 0.25 to 50 p.p.m. by weight of the alkali metal atoms and 0.1 to 40 p.p.m. by weight of the phosphorus atoms.

The alkali metal atoms and phosphorus atoms are incorporated into the organic ester in the form of the above compounds which provide such atoms by any convenient blending technique readily known and understood in the art.

The invention is further illustrated by the following examples wherein dimethyl terephthalate (DMT) is melted and then blended with the additives indicated in the table. Thereafter, the DMT blend samples are placed in receptacles along with stainless steel rods and aged in a heat block maintained at about 165° C. The samples are periodically inspected for APHA color and the number of hours of aging required to achieve APHA color ratings of 25 and 50 are recorded. The results obtained are set forth in the following table.

TABLE I

| Sample No. | Dimethyl terephthalate plus following additives | Hours aged at 165° C. | |
|---|---|---|---|
| | | APHA 25 | APHA 50 |
| A | None | 1 | <24 |
| B | Potassium oxalate (10 p.p.m.) | 1 | 2 |
| C | Potassium oxalate (20 p.p.m.) | 1 | 2 |
| D | Phosphorous acid (10 p.p.m.) | 1 | 665 |
| E | {Phosphorous acid (8 p.p.m.) Potassium oxalate (10 p.p.m.)} | 1 | a >2,064 |
| F | {Phosphorous acid (6 p.p.m.) Potassium oxalate (10 p.p.m.)} | 1 | b >2,064 |
| G | {Phosphorous acid (4 p.p.m.) Potassium oxalate (10 p.p.m.)} | 2 | 1,176 |
| H | {Phosphorous acid (4 p.p.m.) Potassium oxalate (10 p.p.m.)} | 2 | 920 |
| I | {Phosphorous acid (6 p.p.m.) Potassium oxalate (5 p.p.m.)} | 2 | 1,585 |
| J | {Phosphorous acid (4 p.p.m.) Potassium oxalate (5 p.p.m.)} | 2 | 1,752 | a At end of 2,064 hours APHA color is 35.
b At end of 2,064 hours APHA color is 40.
NOTE.—Potassium oxalate contains 47% potassium; phosphorous acid contains 37% phosphorus.

As is apparent from the results in the above table, the combination of potassium oxalate and phosphorous acid provides dimethyl terephthalate with greatly enhanced color stability when subjected to elevated temperatures. An especially effective stabilizer combination is shown by samples E and F.

This invention permits the advantageous storage of dimethyl terephthalate in a molten condition prior to its use as a reactant in the manufacture of polyesters such as poly(ethylene terephthalate) and poly(1,4-cyclohexane-dimethylene terephthalate).

The APHA color standard referred to above is described in the Standard Methods for the Examination of Water by American Public Health Association, 10th edition, pp. 87–89. The APHA value is based upon the p.p.m. platinum present in an aqueous solution of platinum-cobalt chloride. The APHA color rating ranges from below 25 (essentially colorless) to 500, a dark yellow. APHA values of 75 indicate that a slight yellowness is visibly present in the sample.

Thus having described the invention in detail it will be understood by those skilled in the art that certain variations and modifications may be made without departing from the spirit and scope of the invention as disclosed herein and defined in the appended claims.

We claim:

1. An organic ester having improved color stability when in its molten condition which is a dialkyl terephthalate, dialkyl isophthalate or a dialkyl phthalate wherein the alkyl groups have 1 to 10 carbon atoms, said ester being stabilized by (A) about 0.25 to about 200 p.p.m. by weight of alkali metal atoms provided by at least one alkali metal carboxylate having 2 to 18 carbon atoms or alkali metal alkoxide having 1 to 6 carbon atoms, and (B) about 0.1 to about 160 p.p.m. by weight of phosphorus atoms provided by phosphorous acid.

2. The invention of claim 1 wherein the organic ester is a dialkyl isophthalate of which the alkyl substituents have 1 to 10 carbon atoms.

3. The invention of claim 1 wherein the organic ester is a dialkyl terephthalate of which the alkyl substituents have 1 to 10 carbon atoms.

4. The invention of claim 1 wherein the organic ester is a dialkyl phthalate of which the alkyl substituents have 1 to 10 carbon atoms.

5. A composition having improved color stability when in its molten condition consisting essentially of (A) an organic ester selected from the group consisting of dialkyl isophthalates, dialkyl terephthalates and dialkyl phthalates, wherein the alkyl substituents have 1 to 10 carbon atoms, (B) about 0.25 to about 50 p.p.m. by weight of said organic ester of alkali metal atoms provided by at least one alkali metal carboxylate having 2 to 18 carbon atoms or alkali metal alkoxide having 1 to 6 carbon atoms and (C) about 0.1 to about 40 p.p.m. by weight of said organic ester of phosphorus atoms provided by phosphorus acid.

6. A composition according to claim 5 wherein the alkali metal atoms are potassium, sodium, cesium and lithium.

7. A composition according to claim 5 wherein said organic ester is dimethyl terephthalate.

8. A composition according to claim 7 wherein said alkali metal atoms are potassium provided by potassium oxalate.

9. A composition according to claim 8 wherein the ratio of potassium oxalate to phosphorous acid is about 3 to 2.

References Cited

UNITED STATES PATENTS 2,938,015   5/1960   Gormley _____ 260—475 PR

FOREIGN PATENTS

37/15,127   9/1962   Japan _____ 260—475 B

LORRAINE A. WEINBERGER, Primary Examiner

E. J. SKELLY, Assistant Examiner

U.S. Cl. X.R.

260—410.7; 410.9 R; 476 R; 485 S; 488 F; 488 J